(12) United States Patent
Ponce et al.

(10) Patent No.: US 9,907,231 B2
(45) Date of Patent: Mar. 6, 2018

(54) LAWN MOWER CADDY

(76) Inventors: Norberto Ponce, Brownsville, TX (US); Jose B. Garcia, Brownsville, TX (US)

( * ) Notice: Subject to any disclaimer, the term of this patent is extended or adjusted under 35 U.S.C. 154(b) by 810 days.

(21) Appl. No.: 12/453,004

(22) Filed: Apr. 27, 2009

(65) Prior Publication Data

US 2009/0266856 A1  Oct. 29, 2009

Related U.S. Application Data

(60) Provisional application No. 61/071,409, filed on Apr. 28, 2008.

(51) Int. Cl.
| | | |
|---|---|---|
| *B60R 7/00* | (2006.01) |
| *B60R 9/00* | (2006.01) |
| *E06C 7/14* | (2006.01) |
| *A47G 29/02* | (2006.01) |
| *B62B 5/00* | (2006.01) |
| *A01D 75/00* | (2006.01) |

(52) U.S. Cl.
CPC .................................. *A01D 75/008* (2013.01)

(58) Field of Classification Search
CPC ............................ B62B 2202/023; E06C 7/14
USPC ........ 224/401, 548, 560, 564, 274; 220/735; 248/210, 238, 311.2; 280/79.5, 47.38
See application file for complete search history.

(56) References Cited

U.S. PATENT DOCUMENTS

| | | | | |
|---|---|---|---|---|
| 3,642,240 A | * | 2/1972 | Hershey | 248/210 |
| 4,480,810 A | * | 11/1984 | Hall | 248/238 |
| 4,491,257 A | * | 1/1985 | Ingles | 224/407 |
| 4,892,277 A | * | 1/1990 | Tobis | 248/101 |
| 5,040,711 A | | 8/1991 | Niederhauser et al. | |
| 5,052,581 A | * | 10/1991 | Christ et al. | 220/570 |
| 5,417,353 A | * | 5/1995 | Stall | 224/401 |
| 5,531,238 A | * | 7/1996 | Azzarelli et al. | 135/66 |
| 5,881,891 A | * | 3/1999 | Murphy, Jr. | 211/70.6 |
| 6,029,841 A | * | 2/2000 | Fotherby et al. | 220/23.87 |
| D442,409 S | | 5/2001 | Curran | |
| 6,394,325 B1 | * | 5/2002 | Taylor | 224/274 |
| 6,401,996 B1 | * | 6/2002 | Thom et al. | 224/407 |
| 6,823,998 B2 | * | 11/2004 | Fabregas | 211/70.6 |
| 7,077,238 B2 | * | 7/2006 | Butler et al. | 182/129 |
| 7,240,910 B2 | * | 7/2007 | Stuemke | 280/79.5 |
| 7,562,780 B2 | * | 7/2009 | Gilpatrick et al. | 211/70.6 |
| 2006/0157946 A1 | * | 7/2006 | Stuemke | 280/79.5 |
| 2007/0045367 A1 | | 3/2007 | Easom | |

* cited by examiner

*Primary Examiner* — Derek Battisti
(74) *Attorney, Agent, or Firm* — Cesari & Reed LLP; Kirk A. Cesari

(57) ABSTRACT

A lawn mower caddy includes a tray having an array of compartments for housing a variety of desired items and/or accessories therein. The items and/or accessories are those that one may be need when mowing a lawn. The items may include sun block, insecticide spray, a cell phone, a variety of small tools, etc. The tray also incorporates a removable trash container, a paper towel holder and a receptacle for retaining a beverage container. The tray is provided with a pair of hooks for removably supporting the tray from the handlebars of a conventional push lawn mower.

20 Claims, 2 Drawing Sheets

LAWN MOWER CADDY

CROSS-REFERENCE TO RELATED APPLICATION

This application claims the benefit of U.S. Provisional Patent Application Ser. No. 61/071,409, filed Apr. 28, 2008.

BACKGROUND OF THE INVENTION

1. Field of the Invention

The present invention generally relates to receptacles, and more particularly to a lawnmower caddy that provides a tool and paraphernalia tray adapted for removable attachment to a push lawnmower.

2. Description of the Related Art

Too many times while mowing the lawn; one must stop the lawnmower and go to the basement or tool shed to retrieve an item needed at that moment in order to continue to cut the lawn. The item might be a screwdriver or pliers to make a mechanical adjustment to the lawnmower, clippers to trim a recalcitrant root, a cell phone to make a forgotten call or simply a paper towel to wipe away perspiration. Whatever the case, and aside from the annoyance factor, time and energy are wasted in stopping the mower and performing the necessary retrieval. It would certainly be a boon if the items one might expect to employ during the lawn-cutting process were readily available and transported in an adjunct supported on the lawnmower. Thus a lawnmower caddy solving the aforementioned problems is desired.

There are many devices disclosed in the related art that function as adjuncts for transporting small articles on wheeled vehicles. However, none of the known related art, taken either singly or in combination, is seen to disclose a lawnmower caddy as will subsequently be described and claimed.

SUMMARY OF THE INVENTION

The lawnmower caddy comprises a tray having an array of compartments for housing a variety of desired items therein. The items and/or accessories are those that one may be need when mowing a lawn. The items may include sun block, insecticide spray, a cell phone, a variety of small tools, etc. The tray also incorporates a removable trash container, a paper towel holder and a receptacle for retaining a beverage container. The tray is provided with multiple hooks for removably supporting the tray from the handlebars of a conventional push lawnmower. As contemplated, the tray and all auxiliary parts are fabricated from durable, plastic material. It should be recognized however, that other suitable materials may be utilized if desired.

Accordingly, the invention presents a tray capable of housing a variety of items that are usable by a person cutting a lawn. Lightweight, durable and portable, the tray is designed for quick and easy mounting to the handlebars of a push lawn mower. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
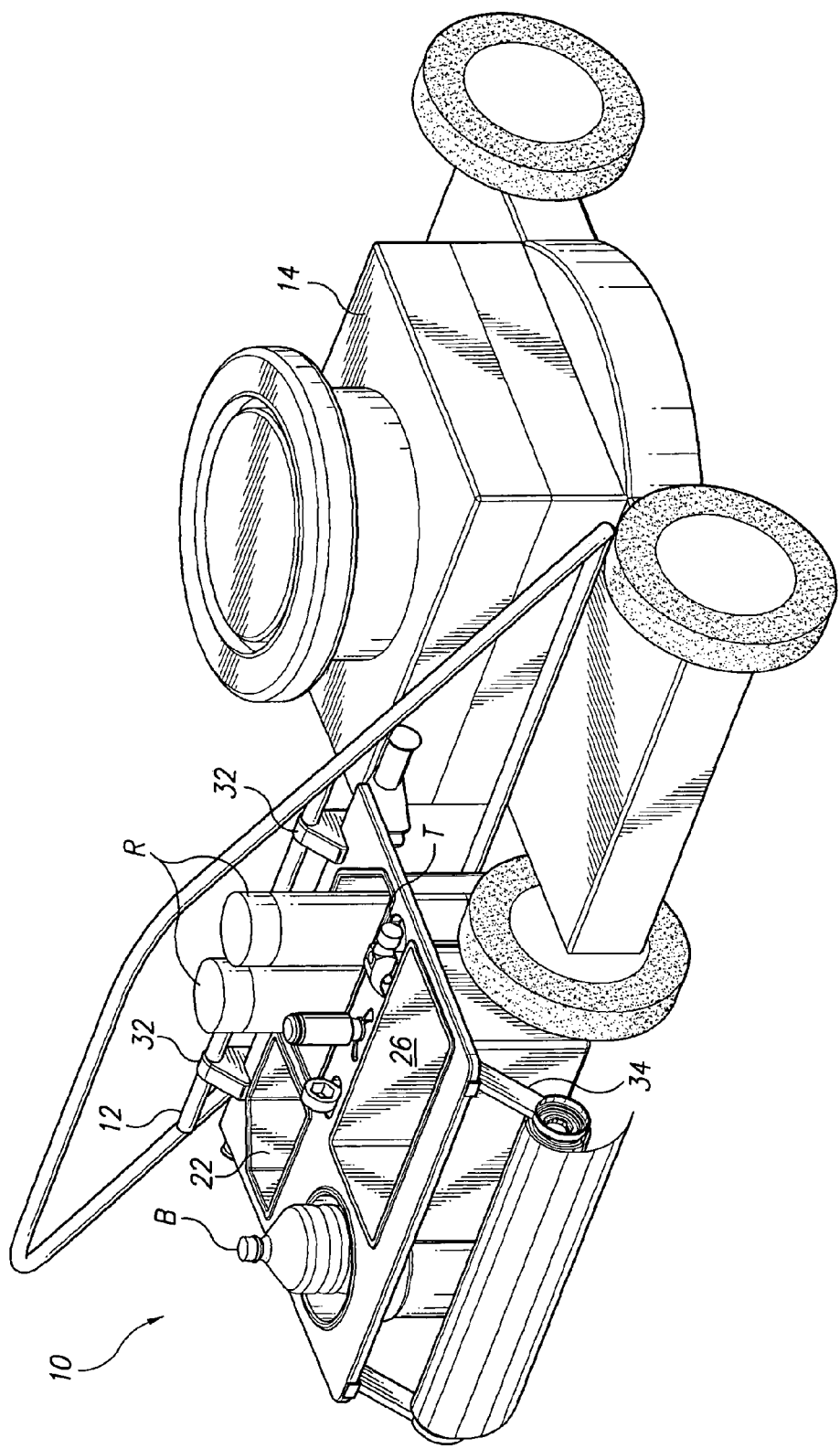
FIG. 1 is an environmental, perspective view of a lawn mower caddy according to the present invention.
Figure 2:
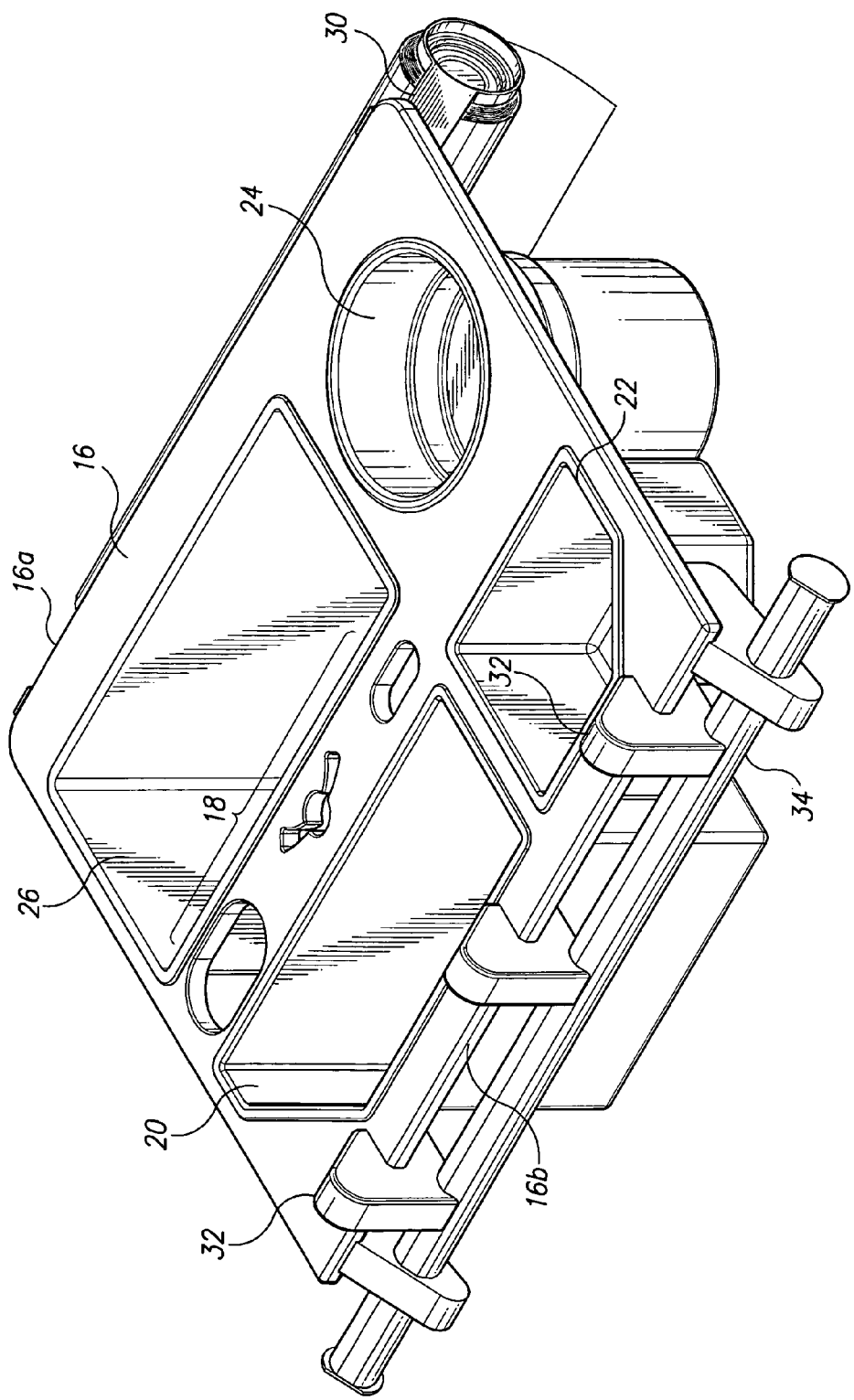
FIG. 2 is a perspective view of a lawn mower caddy according to the present invention.

Attention is directed to FIGS. 1 and 2, wherein the lawn mower caddy is generally indicated at 10. Caddy 10 is a tray removably mounted the handle bar 12 of a conventional push lawnmower 14. Caddy 10 is adapted to house a variety of items, such as small tools T, receptacles R and beverage container B. As best illustrated in FIG. 2, caddy 10 comprises a platform 16 having an array of openings 18 therethrough. Openings 18 are designed to hold the small tools T (pliers, clippers, mallets, etc.). A first open-top receptacle 20 is supported in platform 16 and is of a size to house an array of miscellaneous items R such as bug repellant or sun-block and the like. A second open-top receptacle 22 is in platform 16 and is of a size to house miscellaneous items such as a cell phone and other desired accessories. A third open-top receptacle 24 is in platform 16 and is of a size to house a beverage container B or the like. An opening 26 is designed to house a removable refuse container 28. Receptacles 20, 22 and 24 may be removable from or fixed to platform 16. A paper towel holder 30 is mounted on the undersurface of platform 16 adjacent proximate end 16a. A plurality of hook support members 32 are mounted adjacent the distal end 16b of platform 16. Hook support members 32 are spaced apart and are adapted to engage handle bar 12 when the tray is mounted on the lawnmower. Member 34 is mounted to the undersurface of platform 16 adjacent distal end 16a. Member 34 is slightly wider than platform 16 and provides additional support and bracing for tray 10.

It is to be understood that the present invention is not limited to the embodiment described above, but encompasses any and all embodiments within the scope of the following claims.

We claim:

1. A lawn mower caddy, comprising:
    a platform including a surface, a proximate end, a distal end, and an undersurface, the surface having a plurality of openings formed therethrough for containing items therein;
    lawn mower attachment members mounted on the platform adjacent the distal end, the lawn mower attachment members adapted to attach to a horizontal bar of a lawn mower push assembly;
    a support bar mounted to the platform adjacent the distal end such that the support bar is oriented in a first direction substantially parallel to the horizontal bar of the lawn mower push assembly, and the support bar extends from the distal end away from the platform in a second direction towards the lawn mower push assembly to engage two angled bars of the lawn mower push assembly by resting against an underside of the two angled bars simultaneously while not being attached to the lawn mower push assembly such that the surface is in a substantially horizontal plane to allow the items to remain in the openings when the lawn mower caddy is attached to a lawn mower push assembly, wherein the support bar extends from the distal end in the second direction farther from the distal end than the lawn mower attachment members extend.

2. The lawn mower caddy according to claim 1, wherein at least one of the receptacles is a removable trash container.

3. The lawn mower caddy according to claim 1, wherein said lawn mower attachment members are hooks mounted on the upper surface of said platform.

4. The lawn mower caddy according to claim 1, wherein a paper towel holder is mounted on said undersurface adjacent the proximate end.

5. A lawn mower caddy, comprising:
a platform having a proximate end, a distal end, an upper surface and an undersurface;
a plurality of receptacles supported in the platform, the receptacles having tops open at the upper surface of the platform;
lawn mower attachment members mounted on the platform adjacent the distal end and adapted to attach to a substantially horizontal bar of a lawn mower push assembly a lawn mower;
a paper towel roll holder mounted on the undersurface of the platform adjacent the proximate end; and
a support bar mounted to the undersurface of the platform adjacent the distal end such that the support bar extends from the distal end away from the platform in a first direction substantially parallel to the substantially horizontal bar to engage an underside of an angled bar of a lawn mower push assembly by resting against the underside of the angled bar while not being attached to the lawn mower push assembly and the upper surface is in a substantially horizontal plane when the lawn mower caddy is attached to a lawn mower push assembly, and the support bar extends from the distal end in a second direction substantially perpendicular to the first direction towards the lawn mower and farther from the distal end than the lawn mower attachment members extend.

6. The lawn mower caddy according to claim 5, wherein said lawn mower attachment members are hooks mounted on the upper surface of said platform.

7. The lawn mower caddy according to claim 5, wherein said platform is fabricated from a durable plastic material.

8. The lawn mower caddy according to claim 5, wherein said platform, said plurality of receptacles, said lawn mower attachment members, said paper towel roll holder and said support bar are fabricated from a durable plastic material.

9. The lawn mower caddy of claim 1, wherein the support bar is substantially parallel to the horizontal bar of the lawn mower push assembly.

10. The lawn mower caddy of claim 1, wherein the support bar has a substantially cylindrical shape.

11. The lawn mower caddy of claim 1, wherein the lawn mower caddy is removable from the lawn mower push assembly without removal of any fasteners.

12. A lawn mower caddy comprising:
the lawn mower caddy configured to removably attach to a lawn mower push assembly, the lawn mower caddy including:
a platform including at least one receptacle for receiving an item; and
a lawn mower attachment mechanism including:
at least one hook extending from a distal end of the platform and configured to hang from a cross bar of the lawn mower push assembly, the cross bar having a first direction being substantially horizontal; and
a support bar extending from the distal end of the platform in the first direction to rest against at least one angled bar of the lawn mower push assembly while not being attached to the lawn mower push assembly such that the support bar supports the platform in a substantially horizontal plane when the lawn mower caddy is attached to a lawn mower push assembly, and the support bar extends away from the distal end in a second direction substantially perpendicular to the first direction and farther from the distal end in the second direction than the at least one hook extends.

13. The lawn mower caddy of claim 12, wherein the support bar engages two angled bars of the lawn mower push assembly.

14. The lawn mower caddy of claim 12, wherein the support bar engages the at least one angled bar and is not attached to the at least one angled bar with a fastener.

15. The lawn mower caddy of claim 12, wherein the lawn mower caddy is adapted to be supported only by the combination of the at least one hook and abutment of the support bar resting against the at least one angled bar.

16. The lawn mower caddy of claim 12, wherein the at least one hook comprises multiple hooks.

17. The lawn mower caddy of claim 12, wherein, when a lawn mower associated with the lawn mower push assembly is on an incline, the at least one hook acts as a hinge to allow the platform to rotate about the cross bar and the support bar is not in contact with the at least one angled bar.

18. The lawn mower caddy of claim 17, wherein the at least one hook includes a curved portion to hang from the cross bar.

19. The lawn mower caddy of claim 17, wherein the support bar is adapted to only make contact with a side of the at least one angled bar that is closest to the platform.

20. The lawn mower caddy of claim 12, wherein the support bar is straight from end to end.

\* \* \* \* \*